United States Patent
Daoust

(10) Patent No.: US 9,646,600 B1
(45) Date of Patent: May 9, 2017

(54) TEXT READING AND VOCALIZING DEVICE

(71) Applicant: Roseanne Colette Daoust, Chelmsford (CA)

(72) Inventor: Roseanne Colette Daoust, Chelmsford (CA)

(73) Assignee: Roseanne Colette Daoust, Azilda, Ontario ( * ) Notice: Subject to any disclaimer, the term of this patent is extended or adjusted under 35 U.S.C. 154(b) by 40 days.

(21) Appl. No.: 14/692,915

(22) Filed: Apr. 22, 2015

Related U.S. Application Data

(60) Provisional application No. 61/983,005, filed on Apr. 23, 2014.

(51) Int. Cl.
| | |
|---|---|
| *G06F 17/28* | (2006.01) |
| *G10L 13/00* | (2006.01) |
| *G10L 13/08* | (2013.01) |
| *G10L 13/07* | (2013.01) |

(52) U.S. Cl.
CPC ............ *G10L 13/00* (2013.01); *G06F 17/289* (2013.01); *G06F 17/2872* (2013.01); *G10L 13/07* (2013.01); *G10L 13/08* (2013.01)

(58) Field of Classification Search
CPC ... G06F 17/289; G06F 17/2872; G10L 13/07; G10L 13/08; G10L 13/043
USPC ................................................. 704/2, 3, 5, 7
See application file for complete search history.

(56) References Cited

U.S. PATENT DOCUMENTS

| | | | |
|---|---|---|---|
| 8,699,963 B2 * | 4/2014 | Chen ................................. 381/1 |
| 2005/0205671 A1 * | 9/2005 | Gelsomini ........... G06K 9/2009 235/384 |
| 2008/0309645 A1 * | 12/2008 | Wang .................... G06F 1/1632 345/179 |

* cited by examiner

*Primary Examiner* — Vu B Hang
(74) *Attorney, Agent, or Firm* — Williams Intellectual Property; Benjamin F. Williams

(57) ABSTRACT

A text reading and vocalizing device having an elongate, handheld, manipulable body positional proximal a line of text, whereby movement of the body along the line of text positions a light scanner, distally disposed upon a second body part, to optically recognize text for audible indication of the text sounded by the body or relayed through a pair of headphones interconnected at a headphone jack, wherein text is readable and playable to a user, the text further translatable into an associated language when one of a plurality of language selection buttons, disposed upon the body, is depressed.

6 Claims, 3 Drawing Sheets

TEXT READING AND VOCALIZING DEVICE

CROSS-REFERENCE TO RELATED APPLICATIONS

This nonprovisional application claims the benefit of provisional application No. 61/983,005 filed on Apr. 23, 2014

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of text reading and vocalizing devices are known in the prior art. However, what is needed is an elongate, handheld, manipulable text reading and vocalizing device that enables selection of text in various languages to be interpreted by the text reading and vocalizing device whereby an audible indication of the meaning of is the selected text in producible.

FIELD OF THE INVENTION

The present invention relates to a text reading and vocalizing device, and more particularly, to an elongate, handheld, manipulable text reading and vocalizing device that includes a light scanner illuminable endwise upon a body, said light scanner positional proximal a line of text whereby said text is optically recognizable and renderable into a language selected by a user, whereby the text reading and vocalizing device produces an audible indication of the meaning of the selected text.

SUMMARY OF THE INVENTION

The general purpose of the text reading and vocalizing device, described subsequently in greater detail, is to provide a text reading and vocalizing device which has many novel features that result in a text reading and vocalizing device which is not anticipated, rendered obvious, suggested, or even implied by prior art, either alone or in combination thereof.

The present text reading and vocalizing device includes a body having a first body part and a second body part. The first body part is detachably disposed endwise on the second body part. The first body part has an outwardly facing surface.

Distally disposed on the second body part is a light scanner enabling the present text reading and vocalizing device to illuminate and recognize a line of an extant text disposed on an extant reading material proximally situated to the device. Disposed on the outwardly facing surface of the first body part is a reading button and a headphone jack. A user holds the present text reading and vocalizing device in an orientation relative to the extant text, said orientation maintaining the light scanner to illuminate the extant text when the reading button is depressed. Depression of the reading button illuminates the light scanner and enables the present reading and vocalizing device to optically recognize proximally situated text, determine the meaning of the text, and produce an audible indication of the meaning of the extant text, sounded by the body or relayed to headphones when interconnected with a headphone jack disposed upon the body.

Detachment of the first body part from the second body part enables access to a battery, said battery providing electrical power to the present text reading and vocalizing device. Disposed on the outwardly facing surface of the first body part is a clip enabling detachable disposition of the present reading and vocalizing device to the extant reading material for convenient storage of the present reading and vocalizing device. In an example embodiment, the extant reading material is a book. In another example embodiment, the extant reading material is a newspaper. In an example embodiment, the extant reading material is a magazine. In an example embodiment, the extant reading material is a recipe.

Disposed on the outwardly facing surface of the first body part is a plurality of language selection buttons, manipulation of which produces a language selection. In an example embodiment, the plurality of language selection buttons has a language selection first button and a language selection second button. In an example embodiment, manipulation of the first button selects the English language and manipulation of the second button selects the French language. English text will thus be translated into French. In another example embodiment, manipulation of the first button selects the English language and manipulation of the second button selects the Spanish language, and English text will now be translated into Spanish. Alternate embodiments are contemplated enabling translation of at least a first selectable language into at least a second selectable language.

The outwardly facing surface of the first body part has a volume control having a volume slider receiving slot having a rectangular shape. Disposed in the volume slider receiving slot is a volume slider, manipulation of said volume slider moving the volume slider along the length of said volume slider receiving slot. Manipulation of the volume slider enables user selection of the loudness of the audible indication. Disposed on the volume slider is a low battery indicator light, said low battery indicator light illuminating to provide an indication of the state of the battery.

Thus has been broadly outlined the more important features of the present text reading and vocalizing device so that the detailed description thereof that follows may be better understood and in order that the present contribution to the art may be better appreciated.

Objects of the present text reading and vocalizing device, along with various novel features that characterize the invention are particularly pointed out in the claims forming a part of this disclosure. For better understanding of the text reading and vocalizing device, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
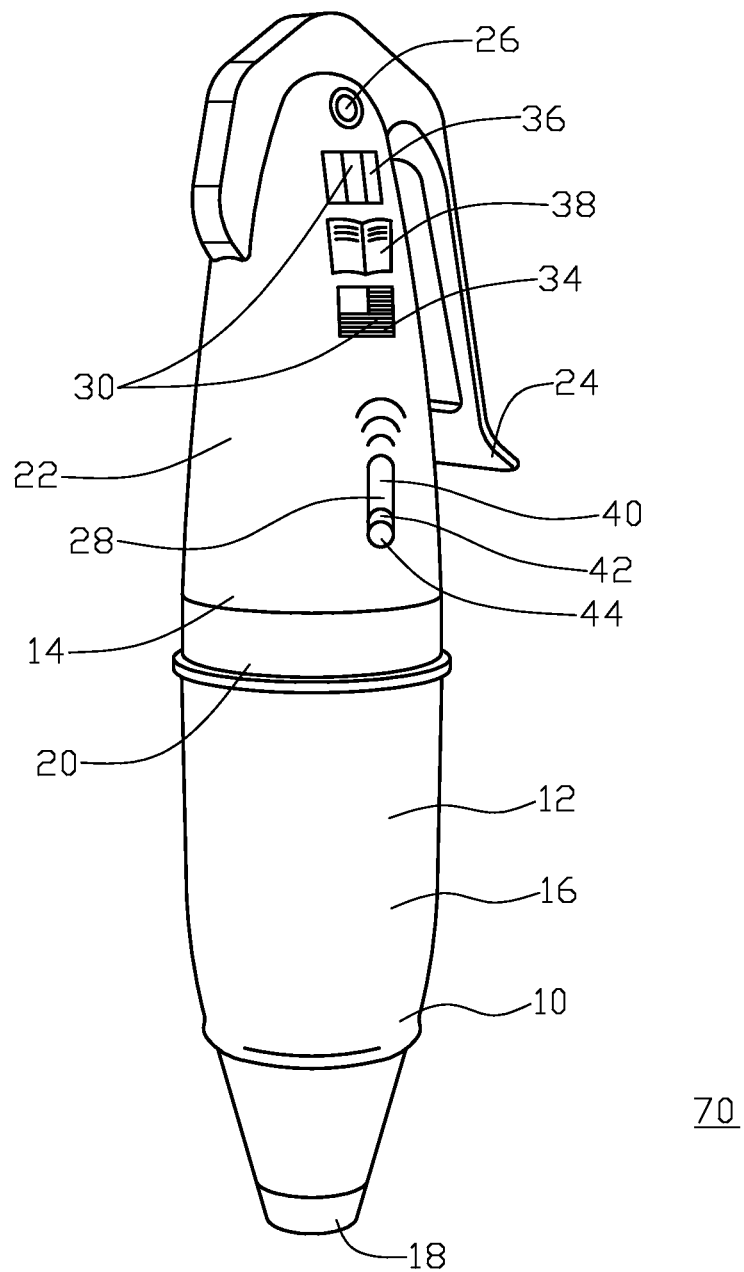
FIG. 1 is an isometric view of the present text reading and vocalizing device.
Figure 2:
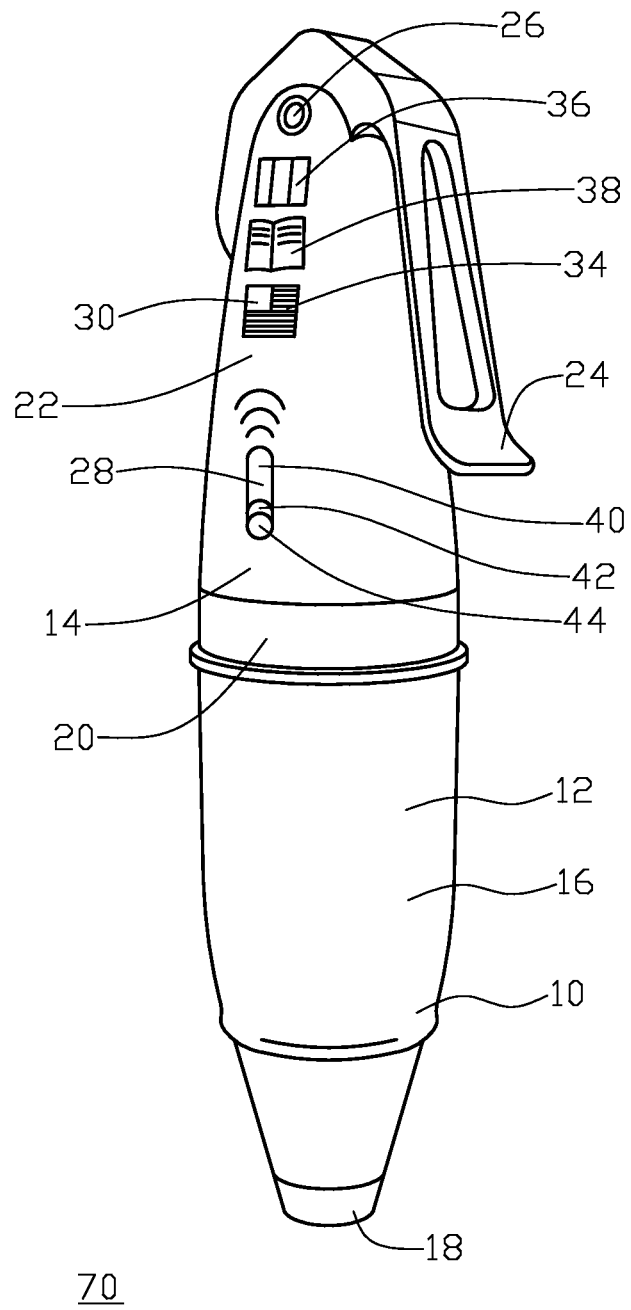
FIG. 2 is an isometric view of the present text reading and vocalizing device.
Figure 3:
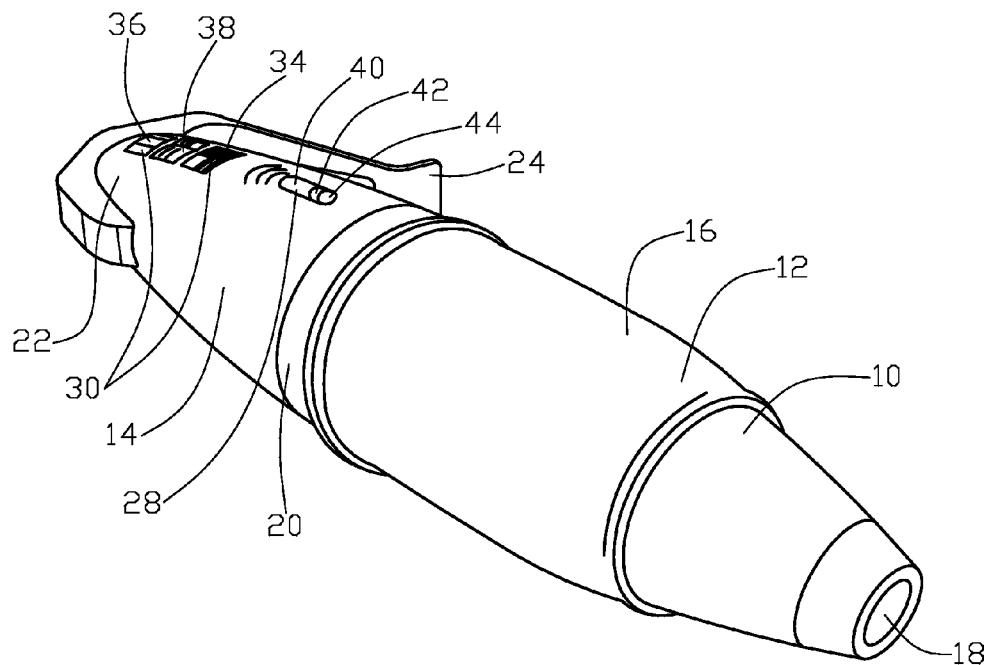
FIG. 3 is an isometric view of the present text reading and vocalizing device.

With reference now to the drawings, and in particular FIGS. 1 through 4 thereof, example of the instant text reading and vocalizing device employing the principles and concepts of the present text reading and vocalizing device and generally designated by the reference number 10 will be described.

Referring to FIGS. 1 through 4, a preferred embodiment of the text reading and vocalizing device 10 is illustrated.

The present text reading and vocalizing device 10 has a body 12, having a first body part 14 and a second body part 16. The first body part 14 is detachably disposed on the second body part 16. Detachment of the first body part 14 from the second body part 16 enables convenient changing of a battery 20 that provides electrical power to the present text reading and vocalizing device 10.

Distally disposed on the second body part 16 is a light scanner 18 enabling the present text reading and vocalizing device to illuminate an extant text 72 disposed on an extant reading material 70, said light scanner 18 also reporting the extant text 72 to the present text reading and vocalizing device 10. The present text reading and vocalizing device 10 interprets the meaning 46 of the extant text 72 and produces an audible indication 48 of the meaning 46.

The first body part 14 has an outwardly facing surface 22. Distally disposed on the outwardly facing surface 22 is a clip 24 enabling convenient detachable disposition of the present text reading and vocalizing device 10 to the extant reading material 70, thereby enabling convenient storage of the present text reading and vocalizing device. Disposed on the outwardly facing surface 22 is a headphone jack 26 enabling detachable disposition of an extant headphones assembly [not shown] by which audible indication 48 of the meaning 46 is privately enabled. Disposed on the outwardly facing surface 22 is a plurality of language selection buttons 30, manipulation of which produces a language selection 32 for recognition of the extant text 72 by the present text reading and vocalizing device 10. In an example embodiment, the plurality of language selection buttons 30 has a language selection first button 34 and a language selection second button 36. In an example embodiment, manipulation of the first button 34 enables selection of the English language and manipulation of the second button 36 enables selection of the French language. In an example embodiment, manipulation of the first button 34 enables selection of the English language and manipulation of the second button 36 enables selection of the Spanish language. Disposed on the outwardly facing surface 22 is a reading button 38, manipulation of which enables operation of the present text reading and vocalizing device 10.

Figure 4:
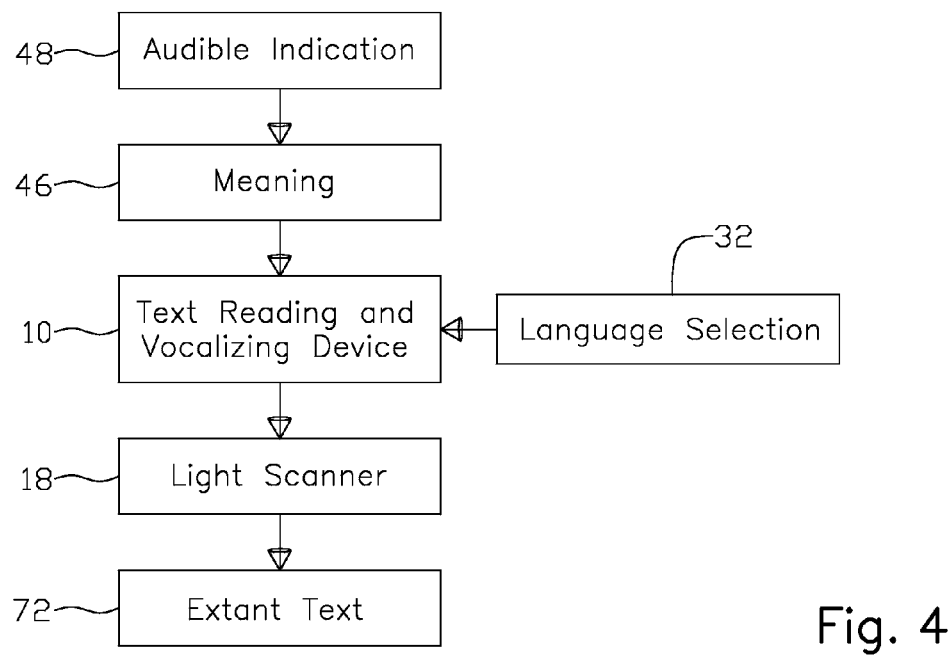
FIG. 4 is block diagram illustrating an example embodiment of recognition of the desired text and production of an audible indication of the meaning of the desired text.

Disposed on the outwardly facing surface 22 is a volume control 28. The volume control 28 has a volume slider receiving slot 40. Disposed in the volume slider receiving slot 40 is a volume slider 42. Manipulation of the volume slider 42 along the length of the volume slider receiving slot 40 enables selection of loudness of the audible indication 48. Disposed on the volume slider 42 is a low battery indicator light 44, said low battery indicator light illuminating to indicate of the state of the battery 20. Referring now to FIG. 4, the extant text 72 is recognized by the light scanner 18 and reported by said light scanner 18 to the present text reading and vocalizing device 10. The language selection 32, is also reported to the present text reading and vocalizing device. The present text reading and vocalizing device interprets the meaning 46 of the extant text 72 and produces an audible indication 48 of the meaning 46.

What is claimed is:

1. A text reading and vocalizing device comprising:
    an elongate body having a first body part detachably disposed upon a second body part;
    a light scanner distally disposed upon the second body part, said light scanner capable of optical character recognition when moved proximal text;
    a reading button disposed upon the body;
    a headphone jack disposed upon the first body part; and
    a plurality of language select buttons disposed upon the first body part;
    wherein movement of the body proximal text enables audible indication of the text reportable to a user when the reading button is depressed and selection of each of the plurality of language buttons renders audible indication into a selected language.

2. The text reading and vocalizing device of claim 1 wherein the plurality of language select buttons includes at least a first language select button and a second language select button audible indication of scanned text is reportable in at least two languages.

3. The text reading and vocalizing device of claim 2 wherein a volume control is disposed upon the first body part whereby slidable position and reposition of the volume control effects a volume level of the audible indication.

4. The text reading and vocalizing device of claim 3 wherein a battery is storable interior to the body whereby the light scanner and the audible indication is powerable.

5. The text reading and vocalizing device of claim 4 wherein the first body part further includes an outwardly facing surface whereon a clip is disposed.

6. A text reading and vocalizing device enabling audible indication payback of scanned text, said text reading and vocalizing device comprising:
    an elongate, handheld manipulable body having a first body part detachably disposed upon a second body part;
    a light scanner distally disposed upon the second body part, said light scanner capable of optical character recognition when moved proximal text;
    a headphone jack disposed upon the first body part;
    a volume control disposed upon the first body part, said volume control positional to effect a volume level of the audible indication;
    a reading button disposed upon the body;
    a plurality of language select buttons disposed upon the first body part; and
    a battery dispositional interior to the body, said battery connectable in circuit to power the light scanner and enable the audible indication;
    wherein movement of the body proximal text enables audible indication of the text reportable to a user when the reading button is depressed, and selection of one of the language selection buttons renders said audible indication into an associated language whereby text is scannable, readable, and translatable to a user.

\* \* \* \* \*